March 1, 1932.　　　E. G. KLOCK　　　1,847,951
HEATING DEVICE
Filed Jan. 23, 1931
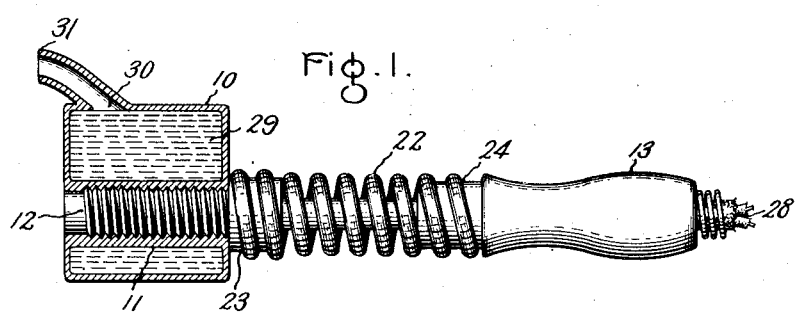
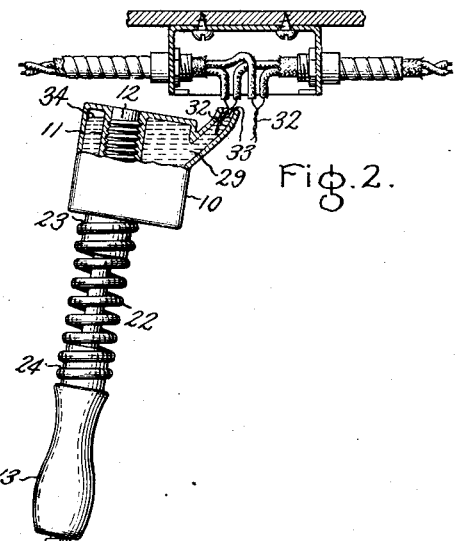
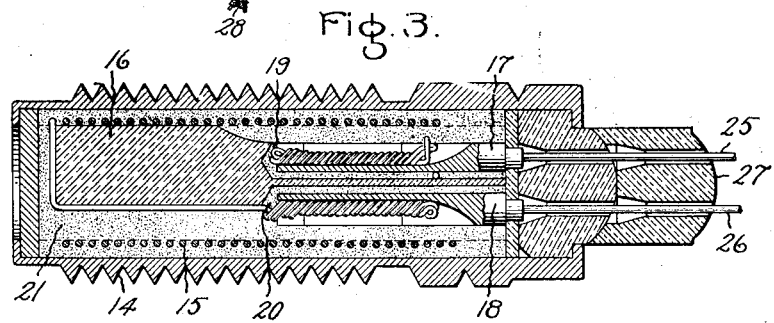
Inventor:
Earl G. Klock,
by Charles V. Tullar
His Attorney Patented Mar. 1, 1932

1,847,951

UNITED STATES PATENT OFFICE

EARL G. KLOCK, OF SCOTIA, NEW YORK, ASSIGNOR TO GENERAL ELECTRIC COMPANY, A CORPORATION OF NEW YORK

HEATING DEVICE

Application filed January 23, 1931. Serial No. 510,738.

My invention relates to heating devices, more particularly to electric melting pots, and has for its object the provision of a simple and convenient device of this character. More specifically my invention relates to elctrically heated melting pots intended to be used in connection with the soldering together of the ends of electrical conductors and the like.

In carrying my invention into effect in one form thereof, I provide a melting pot having walls defining a substantially closed metal receiving and melting chamber or receptacle, access being had to the receptacle through a spout-like member communicating with the interior of the receptacle through a comparatively small opening. This spout preferably will be located so that it will communicate with the upper portion of the metal chamber when the melting pot is held in its working position. This arrangement greatly facilitates soldering operations in that the members to be soldered together can be dipped into the molten solder through the spout without danger of spilling the solder. I prefer to heat the melting pot by means of a suitable electrical resistance element which will be located within a receptacle or chamber provided for it, this chamber preferably being enclosed by the metal melting chamber.

For a more complete understanding of my invention reference may be had to the accompanying drawings in which Fig. 1 is a view partly in section of an electric melting pot embodying my invention: Fig. 2 is a view showing a portion of the melting pot in section and illustrating it in a working position when soldering together the ends of electrical wires or conductors used in electric distribution systems; and Fig. 3 is a sectional view of an electrical resistance heating unit used to heat the melting pot of Fig. 1.

Referring to the drawings, I have shown my invention in one form in connection with a melting pot provided with walls defining a substantially closed metal receiving receptacle 10 and a second receptacle 11 preferably formed integrally with the receptacle 10 and embraced thereby as is clearly shown in Figs. 1 and 2. Within the receptacle 11 is an electrical heating element 12. A suitable handle 13 is provided for the melting pot and its heating element 12. While any suitable heating element and handle may be used, I prefer to use that described and claimed in the United States patent of Charles C. Abbott, No. 1,708,995, dated April 16, 1929. Furthermore, I prefer to use the specific heating unit described and claimed in the United States patent of Charles C. Abbott, No. 1,708,961, dated April 16, 1929.

Briefly, this heating unit comprises a metallic sheath or casing 14, preferably tubular, in which the heating resistance element 15 is secured. As shown this heating element, which will be made of any suitable material such as a nickel chromium alloy, is wound helically on a cylindrical support 16 made of a suitable electrical insulating material, such as lava. The ends of this resistance element are secured to metallic terminals 17 and 18 which are mounted in longitudinal apertures or bores 19 and 20 respectively provided for them in the core 16.

The core 16 with the resistance wire thereon is embedded in the sheath 14 in powderd heat refractory insulating material 21, such as magnesium oxide, and which preferably will be compacted so as to secure the core and resistance element in place and also to increase the heat conductivity of the powdered material.

The sheath 14 is secured directly in the chamber 11 and, as shown, is provided with threads; and the chamber 11 is provided with cooperating threads so as to receive the threaded portion of the sheath, as shown in Fig. 1. The screw threaded engagement between the receptacle 11 and the sheath provides a good thermal contact between these parts so that heat is conducted freely to the melting pot. A loose fit is provided between the chamber 11 and the sheath so that the heating element may be removed easily.

It will be observed that the heating element extends throughout substantially the full length of the chamber 11 and consequently throughout substantially the full length of the metal receiving chamber 10 whereby heat is transferred from the full length of the heating element to the melting pot.

A sheath 14 is secured to the handle 13 by means of a helically shaped member 22, helical V-shaped threads 23 and 24 being provided on the sheath and the handle respectively to receive one or more of the end turns of the member 22.

The terminals 17 and 18 are provided with projecting portions 25 and 26 respectively which are passed through cylindrical insulating members 27 to form an electrical connection (not shown) with the insulated twin supply conductor 28. It will be understood that the receptacle 10 constitutes the melting pot and may be filled with solder or other material 29, which preferably will be charged in the form of rods, wires, pellets, or in any other suitable form. Heat generated by the unit 12 serves to melt the solder or other material within the receptacle 10. The receptacle or melting pot 10 has only a small opening 30 to prevent undue oxidation of the molten solder or other metal. The opening 30 is preferably elongated into a spout-like portion 31 which permits insertion of the ends 32 of twisted wires, rods or other objects of similar configuration for the purpose of soldering. In using my electric melting pot for soldering together the ends of electric wires I prefer to support the pot by means of its handle 13 in an upright position as shown in Fig. 2 so as to maintain the level 33 of the molten solder or other metal near the end of the spout-like portion 31 in order that the requisite length of the wire may be immersed in the molten solder without causing any of the oxides or impurities present on the material to be soldered to be carried into the main body of the molten solder 29. By restricting the quantity of the solder which comes in contact with the air and with the material to be soldered to that relatively small portion in the spout-like member 31 the impurities may be removed from the melting pot without losing more than a very small amount of molten material. Furthermore, by presenting only a very small surface of the molten solder to the atmosphere the amount of oxidation that can take place from that source is very materially reduced. The liquid level 33 may be maintained at the desired point without frequent additions of solder to make up for that consumed in the use of the device by slightly tipping the melting pot since a relatively small drop in level of the liquid in the main portion of the melting pot 29, owing to its relatively great area, will compensate for a relatively great drop in the level of the molten solder in the spout-like portion, but since the main portion of the container is not in contact with the atmosphere even through the level 34 within the container recedes considerably from the upper wall of the container no oxidation will take place on this surface.

The present invention has the further advantage that by exposing only a small surface of the molten metal, the radiation of heat which is injurious to the insulation of the wires to be soldered can be reduced and restricted more nearly to that of the metallic wire which has been stripped of insulation.

With respect to operation of the melting pot my invention has the advantage that solder will not overflow while the pot is being tipped. There are the further advantages, inherent in the construction of the pot, that it is merely necessary to bring it under the twisted wires to be soldered, and that the pot may be raised without any danger of spilling, thereby promoting economy of material and time, and preventing damage to objects located below the work, as well as preventing injury to the workman, even when he is obliged to work in an awkward position.

While I prefer to employ an electric heating element in my device for melting the solder or other material, it is to be understood that my invention is not limited to melting pots employing that source of heat, but obviously includes melting pots heated by other means.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States is:

1. An electrically heated device for effecting soldering and like operations comprising integral wall structure defining a metal melting chamber, said wall structure being provided with a spout-like member protruding therefrom and communicating with the interior of said chamber, the chamber being otherwise closed and said spout-like member being arranged to receive the elements to be soldered, and an electrical heating element arranged to apply heat to said chamber.

2. A soldering device comprising a substantially closed hollow metal melting chamber of integrally formed bounding walls and provided with a spout-like member protruding from one of said walls, said spout-like member providing the only means of communication with said chamber and being arranged to receive the articles to which the solder is to be applied, and an electric heating element arranged to apply heat to said chamber to melt the solder inserted therein.

3. An electrically heated soldering device comprising an integral metallic wall structure defining a metal melting chamber and a second chamber embraced by said first chamber, one of the walls of said first chamber being provided with a protruding spout-like member providing the only means of communication with said chamber and an electrical heating element mounted within said second chamber.

4. An electrically heated soldering device comprising an integral wall structure defining a pair of chambers, the first constituting a metal melting chamber and encircling the second, said melting chamber having a spout-like member projecting from one wall thereof, the spout-like member providing the only means of communication with said melting chamber and being arranged to receive the elements to be joined, an electrical heating element within said second chamber and a handle attached to said wall structure arranged so that the device can be brought into working position whereby the solder in said melting chamber flows into said spout and into contact with the articles received within said spout.

5. An electrically heated soldering device comprising a metallic wall structure defining a substantially closed metal melting chamber and a second chamber embraced by said metal melting chamber, the melting chamber being provided with a spout-like member projecting from one wall thereof, this member providing the only means of communication with said melting chamber and being arranged to receive the elements to be soldered, an electric heating element mounted within said second chamber and a handle attached to said heating element so that said soldering device can be brought into working position whereby the solder in said melting chamber flows into said spout and the articles to be soldered and received within said spout are brought into contact with said solder.

6. A device for soldering over-head elements and the like comprising a wall structure defining a metal melting chamber and a second chamber coextensive with said melting chamber and embraced thereby, a spout-like member protruding from one of the walls of said melting chamber providing the only communication therewith, an electrical heating element arranged within and substantially coextensive of said second chamber and a handle secured to said heating element so that the device may be held in a substantially vertical position and elevated to the over-head elements to be soldered, said spout-like member being arranged so that its mouth opens somewhat above the upper walls of said melting chamber when the device is supported in a substantially vertical position so as to receive said over-head elements therein and whereby by slightly tilting the device from the vertical molten solder from said chamber flows up in said spout-like member to a point adjacent its mouth and in contact with said overhead elements inserted in said member.

7. A soldering device comprising integral wall structure defining a comparatively large hollow metal melting chamber, an electrical heating element arranged to heat said chamber and a handle attached to said heating element whereby the soldering device can be conveniently used, said wall structure being provided with a substantially small opening providing the only communication with said melting chamber and through which articles to be soldered are passed into contact with the molten solder in said chamber, and said wall structure and opening being arranged so as to prevent the over-flow of solder from said melting chamber during the normal operation of said device.

In witness whereof, I have hereunto set my hand.

EARL G. KLOCK.